(12) United States Patent
Arjomand

(10) Patent No.: US 8,978,211 B2
(45) Date of Patent: Mar. 17, 2015

(54) UNIVERSAL ADJUSTABLE-LENGTH TIE-WRAP

(76) Inventor: Ataullah Arjomand, Bellevue, WA (US)

( * ) Notice: Subject to any disclaimer, the term of this patent is extended or adjusted under 35 U.S.C. 154(b) by 260 days.

(21) Appl. No.: 13/463,395

(22) Filed: May 3, 2012

(65) Prior Publication Data

US 2013/0291343 A1    Nov. 7, 2013

(51) Int. Cl.
*B65D 63/00*    (2006.01)
*B65D 63/10*    (2006.01)

(52) U.S. Cl.
CPC ............. *B65D 63/1027* (2013.01); *Y10T 24/14* (2015.01); *Y10T 24/1498* (2015.01)
USPC .......... 24/16 R; 24/16 PB; 24/17 AP

(58) Field of Classification Search
CPC . Y10T 24/1498; F16L 3/233; B65D 63/1063; B65D 63/1081; H02G 3/266; H02G 3/30
USPC .............. 24/16 PB, 16 R, 17 AP, 19, 30.5
See application file for complete search history.

(56) References Cited

U.S. PATENT DOCUMENTS

| | | | | |
|---|---|---|---|---|
| 3,102,311 A * | 9/1963 | Martin et al. | ............. | 24/16 PB |
| 3,118,200 A * | 1/1964 | Bell | ............. | 24/16 PB |
| 3,530,544 A * | 9/1970 | Burniston | ............. | 24/16 R |
| 3,605,199 A * | 9/1971 | Eberhardt | ............. | 24/16 PB |
| 3,618,173 A * | 11/1971 | Schwartz | ............. | 24/16 PB |
| 3,654,669 A * | 4/1972 | Fulton | ............. | 24/16 PB |
| 3,672,003 A * | 6/1972 | Morgan | ............. | 24/16 PB |
| 3,735,449 A * | 5/1973 | Rosales | ............. | 24/16 PB |
| 3,747,164 A * | 7/1973 | Fortsch | ............. | 24/16 PB |
| 3,855,670 A * | 12/1974 | Brudy | ............. | 24/16 PB |
| 3,942,750 A * | 3/1976 | Noorily | ............. | 248/74.3 |
| 3,973,293 A * | 8/1976 | Noorily | ............. | 24/16 PB |
| 4,422,217 A * | 12/1983 | Barrette | ............. | 24/16 R |
| 4,447,934 A * | 5/1984 | Anscher | ............. | 24/16 PB |
| 4,507,828 A * | 4/1985 | Furutsu | ............. | 24/16 PB |
| 4,574,434 A * | 3/1986 | Shupe et al. | ............. | 24/16 PB |
| 4,609,171 A * | 9/1986 | Matsui | ............. | 248/74.3 |
| 4,665,588 A * | 5/1987 | Nakano | ............. | 24/16 PB |
| 4,862,560 A * | 9/1989 | Lichtenberg | ............. | 24/16 PB |
| 5,031,943 A * | 7/1991 | Scott et al. | ............. | 292/307 R |
| 5,212,928 A * | 5/1993 | Scott et al. | ............. | 53/417 |
| 5,295,285 A * | 3/1994 | Shely | ............. | 24/16 PB |
| 5,537,719 A * | 7/1996 | Freed | ............. | 24/16 PB |
| 5,836,053 A * | 11/1998 | Davignon et al. | ............. | 24/16 PB |
| 5,901,416 A * | 5/1999 | Mears | ............. | 24/16 PB |
| 6,047,448 A * | 4/2000 | Arnold | ............. | 24/16 PB |
| 6,070,304 A * | 6/2000 | Lii | ............. | 24/16 PB |
| 6,347,434 B1 * | 2/2002 | Newman | ............. | 24/16 PB |

(Continued)

*Primary Examiner* — Robert J Sandy
*Assistant Examiner* — David Upchurch
(74) *Attorney, Agent, or Firm* — Ataullah Arjomand

(57) ABSTRACT

Reusable tie-wraps of arbitrary or unlimited length are discussed that can be cut to any desirable size at the time of use. These tie-wraps allow wrapping of any size object and include a flexible strap part and a locking part, both of which can be reused numerous times. The tie-wrap strap has flexible pawls which can bend or can rotate around a hinged base where pawls are attached to the strap. To use the tie-wrap, the user cuts a piece from the flexible strap bundle and inserts its ends into a locking part and pulls one or both ends of the strap until it is tightly wrapped around the object. In other embodiments the ends of the strap may enter the locking part from one side or from multiple sides. Discussed tie-wraps may be used, in addition to wrapping, to form handles or tag holders for the wrapped object.

4 Claims, 8 Drawing Sheets

(56) References Cited

U.S. PATENT DOCUMENTS

| | | | |
|---|---|---|---|
| 6,718,598 B2 * | 4/2004 | Gorman et al. | 24/30.5 W |
| 6,763,553 B2 * | 7/2004 | Hatch | 24/16 PB |
| 6,823,564 B2 * | 11/2004 | Gorman et al. | 24/30.5 R |
| 6,938,305 B2 * | 9/2005 | Garver | 24/16 PB |
| D631,328 S * | 1/2011 | Chen | D8/356 |
| 2004/0154139 A1 * | 8/2004 | Crook | 24/16 PB |
| 2005/0204515 A1 * | 9/2005 | Hewes | 24/16 PB |
| 2005/0242247 A1 * | 11/2005 | Geiger | 248/74.3 |
| 2007/0234524 A1 * | 10/2007 | Witt | 24/16 PB |
| 2011/0167594 A1 * | 7/2011 | Gmeilbauer | 24/16 PB |
| 2012/0180270 A1 * | 7/2012 | Marmelstein | 24/16 R |

\* cited by examiner

UNIVERSAL ADJUSTABLE-LENGTH TIE-WRAP

CROSS-REFERENCE TO RELATED APPLICATIONS

This application relates to U.S. Utility patent application Ser. No. 12/698,547, filed on Feb. 2, 2010.

TECHNICAL FIELD

The disclosed embodiments relate, in general, to packing and Packaging and, in particular, to flexible tie-wraps.

BRIEF DESCRIPTION OF THE DRAWINGS

Subject matter is particularly pointed out and distinctly claimed in the concluding portion of the specification. The foregoing and other features of this disclosure will become more fully apparent from the following description and appended claims, taken in conjunction with the accompanying drawings. Understanding that these drawings depict only several embodiments in accordance with the disclosure and, therefore, are not to be considered limiting of its scope; the disclosure will be described with additional specificity and detail through use of the accompanying drawings. Various embodiments will be described referencing the accompanying drawings in which like references denote similar elements, and in which:

FIG. 5A shows the two example strap ends entering a first locking head from different sides and move through the locking head in different directions, while FIG. 5B shows two example strap ends entering a second locking head from a same side of the locking head and moving through the locking head in a same direction.

FIGS. 7A, 7B, and 7C show three examples of 2-entry locking heads, while FIG. 7E shows one example of a 4-entry locking head. FIG. 7D shows an example of a "distant passage locking head," where not all the strap passages have exit holes or are adjacent to each other.

DETAILED DESCRIPTION

In the following detailed description, reference is made to the accompanying drawings which form a part hereof, and in which are shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. Also, various operations may be described as multiple discrete operations in turn, in a manner that may be helpful in understanding embodiments; however, the order of description should not be construed to imply that these operations are order-dependent.

Figure 1:
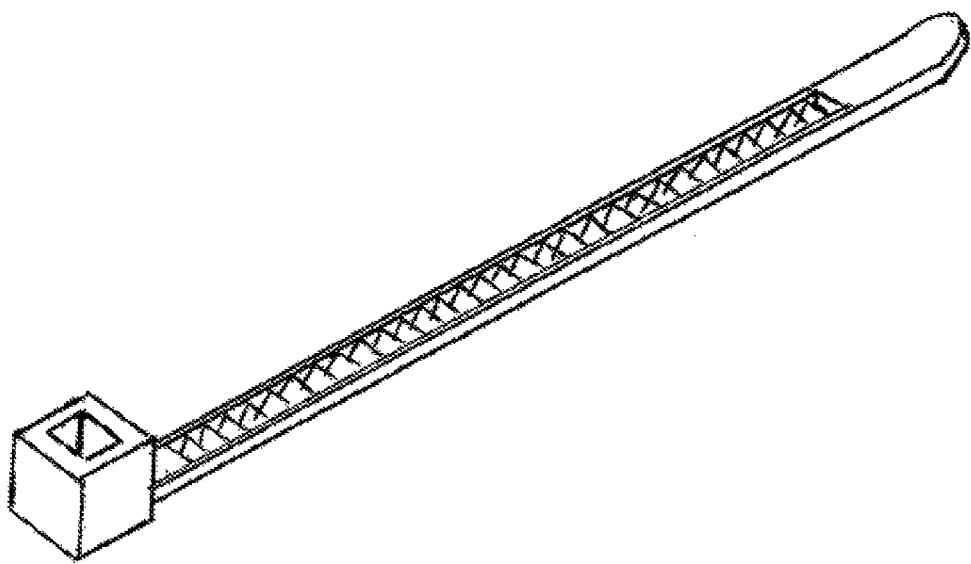
FIG. 1 illustrates a prior art tie-wrap.

Tie-wraps, also known as cable-ties and harnessing devices, are typically molded plastic devices that have a strap and a head piece and are commonly used for securely wrapping a box or package, and also for holding together a bundle of objects, such as wires or cables, among other common wrapping applications. In most tie-wraps the strap has a series of grooves extending along the length of the strap. The head piece may include a strap receiving channel in the form of an opening that contains a flexible pawl, in the form of a flexible catch, the tip of which mates with one of the grooves on the strap. The end of the strap is inserted through the opening of the head piece to form a closed loop and can be pulled to tighten and reduce the diameter of the closed loop. As the strap tightens, the pawl locks into a groove to prevent the strap from backing out and loosening. An example of such a cable tie, shown in FIG. 1, is found in U.S. Pat. No. 3,605,199.

Tie-wraps serve different uses ranging from automobile construction to bundling wires, to almost anything else which might require a strap tied around it. The wide-spread use of cable ties attests to their reliability, convenience, and overall utility. Nevertheless, problems persist. For example, the length of a tie-wrap limits the ability to wrap an object the circumference of which is larger than the length of the tie-wrap. For this reason a user needs to carry batches of different length tie-wraps. And if even the longest available tie-wrap is not sufficient, the user must attach several tie-wraps together to form a longer tie-wrap chain for wrapping a large object or package. In addition, the traditional tie-wraps are designed for one-time use, which waste a number of resources, such as material, water, energy, and landfill, among others, and negatively impact the environment.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other via one or more intermediate elements or components.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB), that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

The existing tie-wraps come in specific prefabricated lengths, and each tie-wrap is composed of a strap and a head (locking head) that is attached to the strap. These tie-wraps are usually about a few inches to a few feet in length. FIG. 1 illustrates a typical tie-wrap. If the circumference of an object to be wrapped is more than the length of the tie-wrap, such as a large box or a luggage, the user may have to attach a few tie-wraps end-to-end together by inserting the end of each tie-wrap into the head of another tie-wrap until a tie-wrap "chain" of desired size is assembled. Doing so wastes several heads and a part of every tie-wrap, and creates an unappealing appearance and an uneven and knotted strap, which does not lay evenly and flatly on the surfaces of a box or other package. In addition, it wastes user's time and effort.

Figure 2:
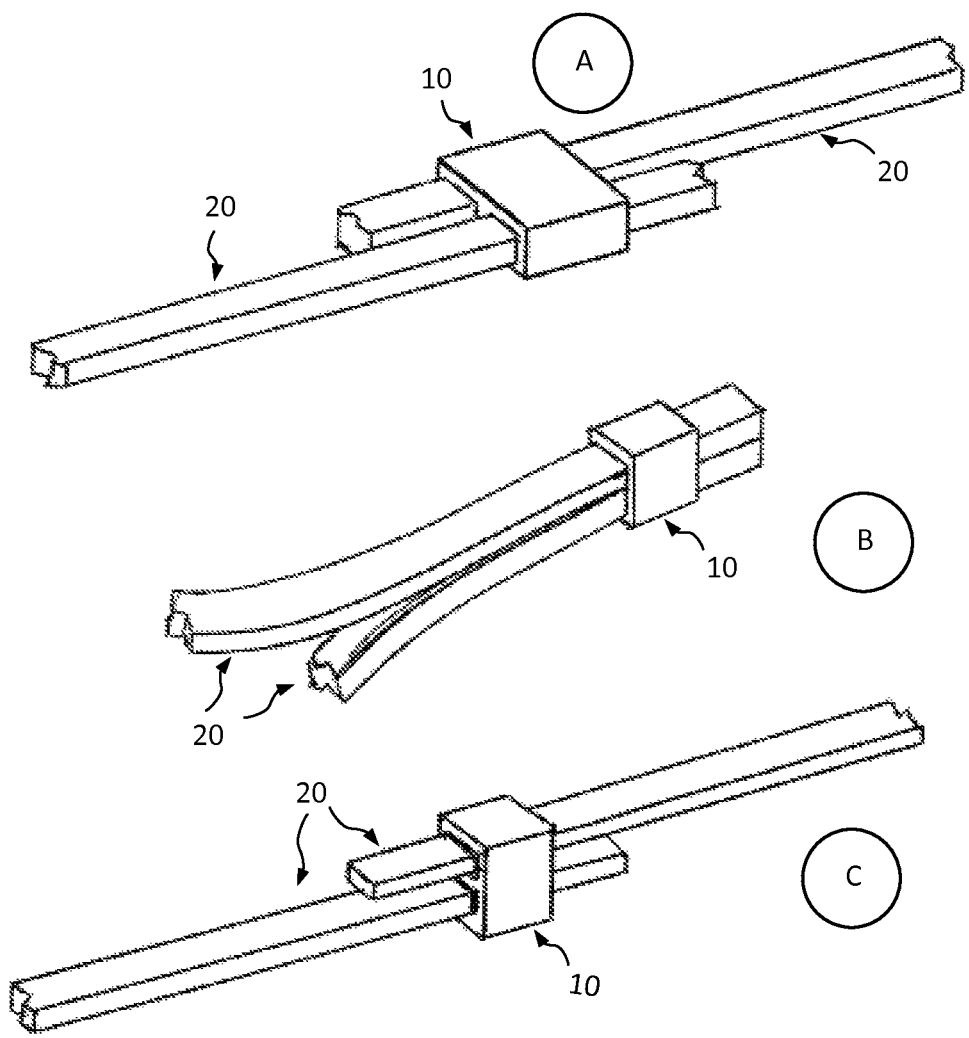
FIGS. 2A, 2B, and 2C show example straps and locking heads.

Generally stated, aspects of the present disclosure are directed to a strap of any uniform or varying cross-section, such as a rectangular cross-section or a round cross-section, and a locking head that in some embodiments is not an integral part of or physically connected to the strap. For example, an embodiment comprises a strap of arbitrary or adequate length sufficient for multiple wrappings around an object using physically separate individual locking head pieces. Each locking-head, along with a segment of the strap cut to any desired length, may be used for one wrapping application. In this example, to tie an object or several objects together, a user may cut a piece of the strap to any arbitrary size, long enough to serve the user's purpose, and tighten it around the object(s) by inserting the two ends of the strap piece in a single locking head and pulling one or both ends until the strap is tight enough around the object. If desired, the user can wrap a strap of sufficient length several times around the object(s) before inserting its ends into the locking head. FIGS. 2A, 2B, and 2C show three different example straps 20 and locking heads 10.

Another advantage of the disclosed embodiments is that, unlike the prior art tie-wraps which can be used only once, both the disclosed straps and the locking heads can be reused over and over again. For example, after cutting a tied strap from around a previously wrapped package, the strap can be pulled out of the locking head in the same direction as it had entered the locking head and both the strap and the locking head be reused to wrap another package.

Unlike some traditional wrapping apparatuses and methods, the disclosed embodiments do not require any tools, for example for crimping the locking head to restrict the movement of the strap within the locking head or for tightening the strap around the object. However, the use of special or conventional tools can help with further tightening of the straps around objects and packages.

Figure 3:
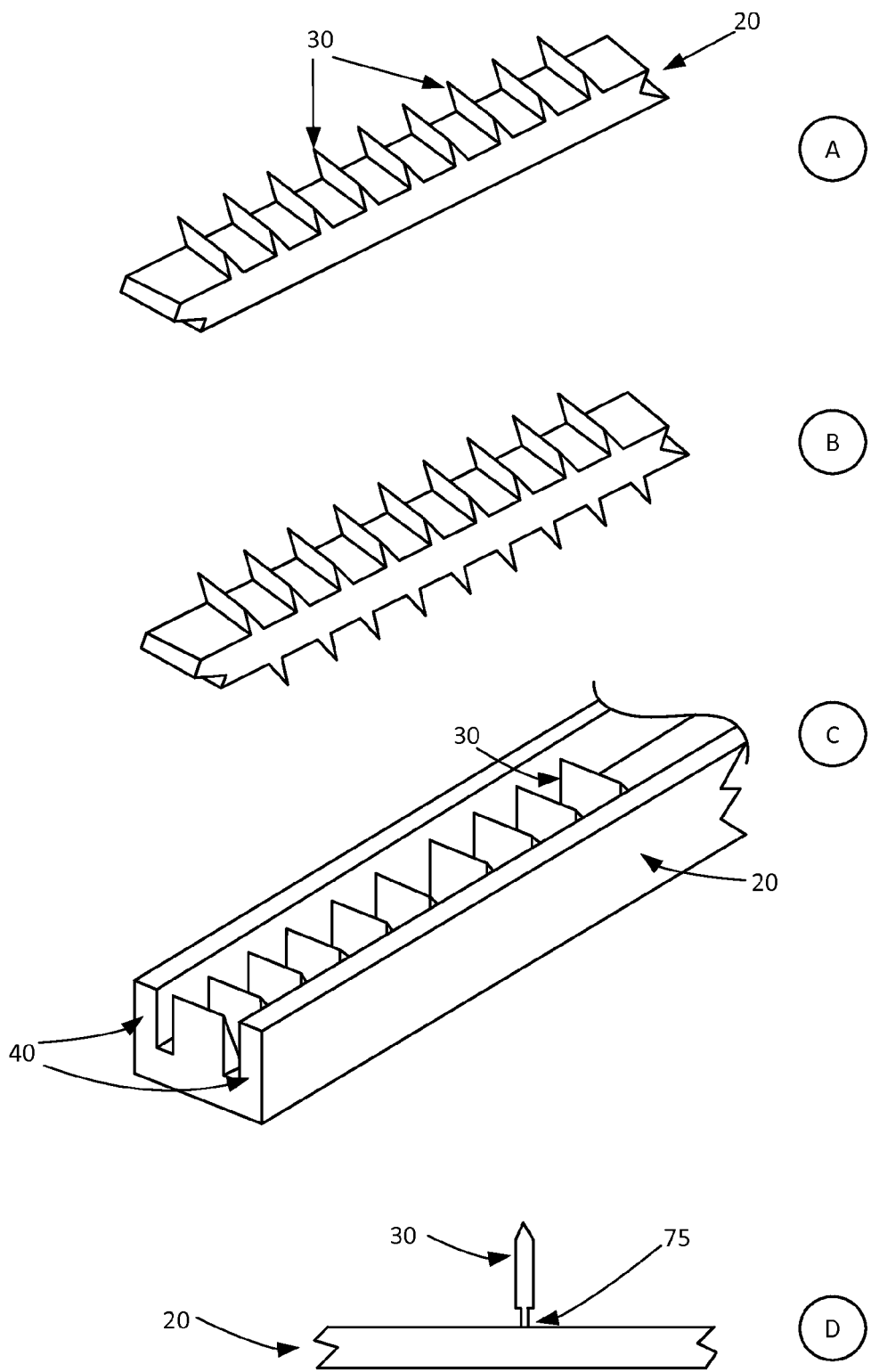
FIGS. 3A, 3B, 3C, and 3D show example straps with pawls.

As shown in FIGS. 3A, 3B, and 3C, in some embodiments one or more sides of the straps 20 have flexible pawls 30 that can bend and curve or can rotate, without curving, about a hinged base where the pawls attach to the strap, while entering a locking head 10 and engage one or more internal surfaces of the locking head 10 to restrict the relative movement of the straps 20 with respect to the locking head 10 to one direction. As seen in FIG. 3C, in some embodiments the pawls 30 may not be completely exposed, rather, be wholly or partially confined within a channel 40. In some embodiments the strap pawls 30 are integral parts of the strap 20; for example, flexible plastic protrusions made while molding the strap 20. In other embodiments sharp metal pawls 30 may be embedded into the straps 20, which effectively dig into and engage the inside surfaces of the locking head 10.

In some embodiments of strap 20, pawls 30 may be bendable and may curve in response to pushing strap 20 through the passage way 70. In other embodiments pawls 30 may be rigid but hinged at their connection point to strap 20 so that the pawls 30 bend and swivel around their respective hinges when pushed through the passage way 70. An example of an inexpensive hinge is a thin or weak point in the pawl 30 material at the point of connection to strap 20, as shown in FIG. 3D. In this embodiment, pawl 30 swings or pivots around its base 75 as a result of being inserted into a passage way 70 without any or minimum deformation or curving of the pawl body.

Figure 4:
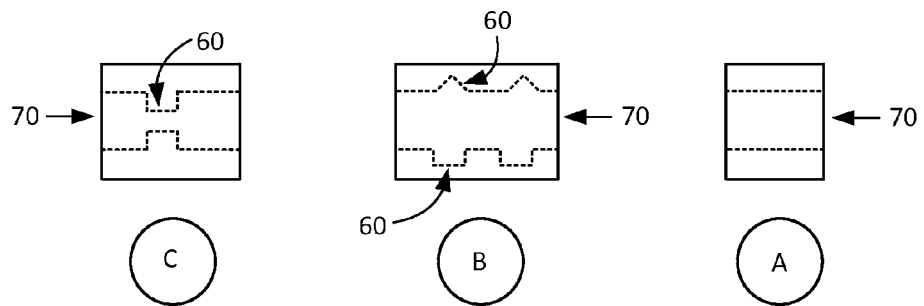
FIG. 4 illustrates cross-sectional views of locking heads and associated passage ways.

In some embodiments, such as those depicted in FIG. 4, the locking mechanism within the locking head 10 uses one or more groves 50 that allow effortless passage of the strap 20 through the locking head 10 in one direction but strongly resist the strap movement in an opposite direction with respect to the direction of entrance. In one embodiment the movement of strap 20 may be restricted by a single groove 50, in another embodiment the movement of strap 20 may be restricted by multiple groves 50, and in yet another embodiment by a combination of both, for example one grove 50 in one passage way 70 and multiple groves 50 in another passage way 70 or one groove 50 on one surface of a passage way 70 and multiple grooves 50 on another surface of the same passage way 70. Groves 50 may be manufactured as an integral part of locking heads 10, for example as a molded part of a plastic locking head 10, or be a separate piece added to the locking head 10, such as a metal grove 50 embedded into a plastic locking head 10. Groves 50 may be also entrenched into one or multiple sides of a passage way 70. Other mechanisms may be used to restrict the movement of straps 20 within locking heads 10, such as but not limited to rough surfaces within passage ways 70 or protrusions 60 across one or more surfaces of passage ways 70.

In different embodiments the number and orientation of strap passage ways 70 through a locking head 10 are different. Also in some embodiments, each passage way 70 may allow the passage of more than one strap ends through it. In these embodiments, strap 20 may enter a passage way 70 of locking head 10 from either side, which makes it easier for the users to utilize locking heads 10 without the need to insert strap 20 into any particular end of and/or in a predetermined direction through passage way 70.

Figure 5:
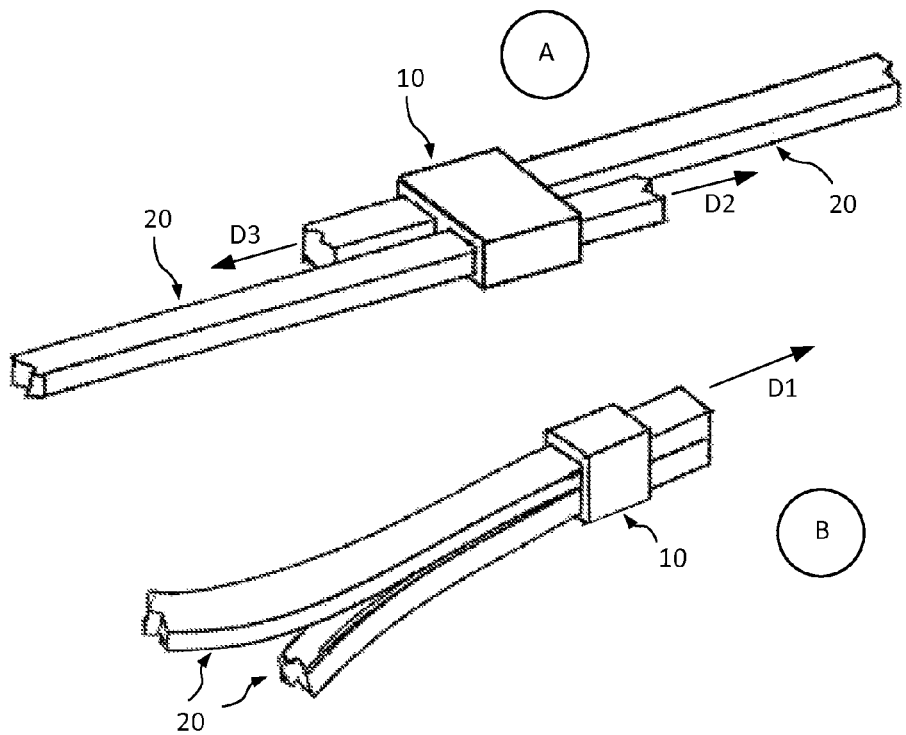
FIGS. 5A and 5B show two example straps entering two locking heads.

In some embodiments, as shown in FIG. 5A, the ends of strap piece 20 enter locking head 10 from different sides and move through locking head 10 in different directions D2 and D3, while in another embodiment, as shown in FIG. 5B, the ends of strap piece 30 may enter locking head 10 from the same side of the locking head 10 and move through locking head 10 in the same direction D1.

Figure 6:
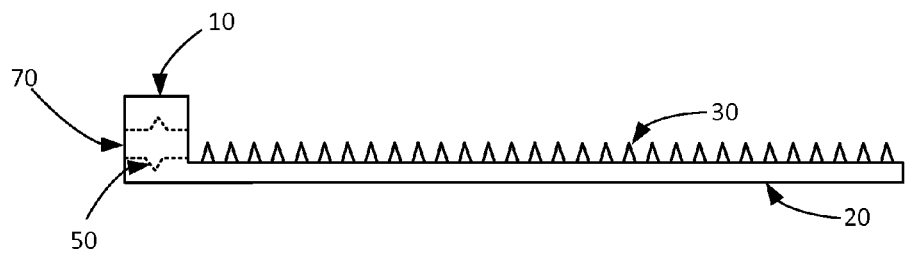
FIG. 6 shows an example strap and locking head in an attached embodiment.

In some embodiments, strap 20 and locking head 10 are manufactured as one piece. FIG. 6 shows an example strap 20 and locking head 10, in an attached embodiment.

Figure 7:
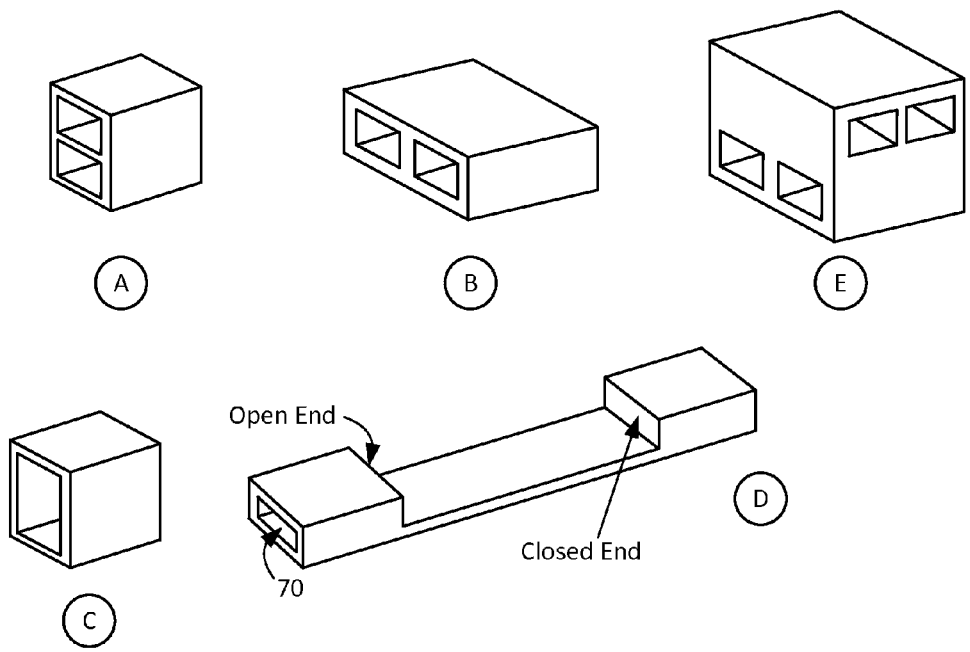

In some embodiments locking head 10 may have one or multiple entrances for ends of multiple strap pieces 20 and/or one or multiple exits for ends of multiple strap pieces 20. For example, FIGS. 7A, 7B and 7C show three different 2-entry locking heads and FIG. 7E shows one 4-entry locking head. Different locking heads, such as the ones depicted in FIG. 7, may be manufactured for different purposes, for example, for wrapping an object with a wrap loop in a single plane or with multiple wrap loops in multiple planes. As depicted in FIG. 7D, neither the strap passages 70 of a locking head need to be adjacent to each other nor do they all need to have exit holes.

Figure 8:
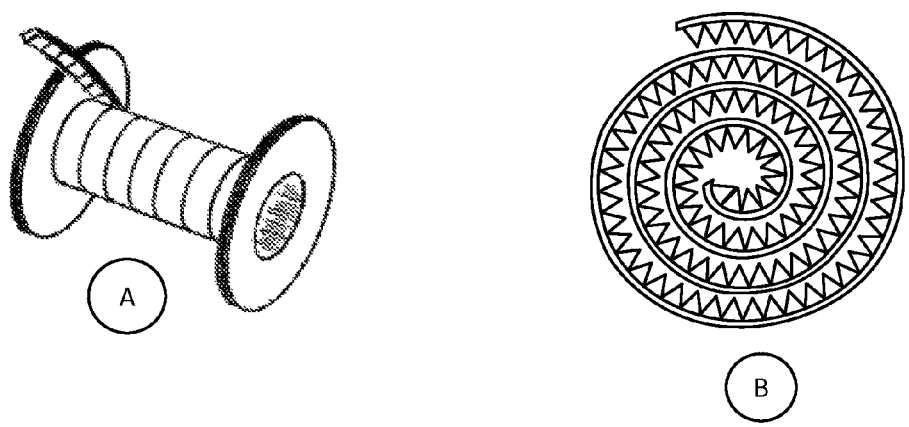
FIGS. 8A and 8B show examples of efficient packaging of straps, such as a spool and a bundle, respectively.
Figure 9:
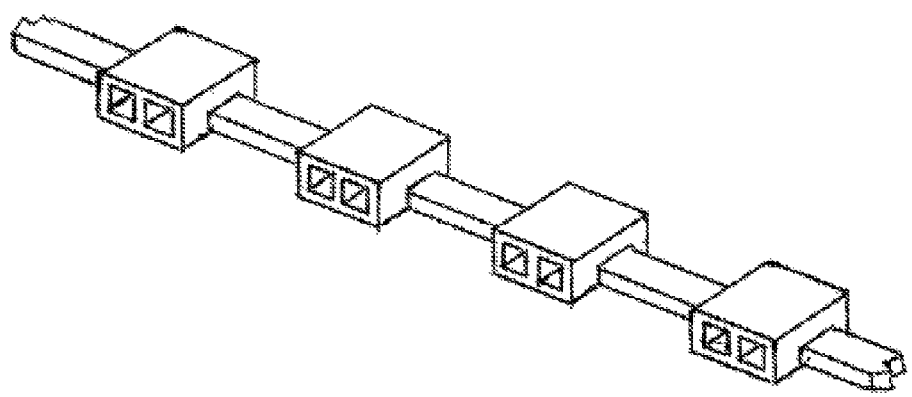
FIG. 9 shows example locking heads that are attached to each other.

For efficient packaging a strap 20 may be wound around a spool or just wrapped in a loop as shown in FIGS. 8A and 8B, or packaged in any other way. The locking heads may also be manufactured individually, attached to each other in a row, or in any other form as depicted in FIG. 9, but easily separable by hand or by scissors. A locking head row can also be wound around a spool or wrapped in a loop form.

Figure 10:
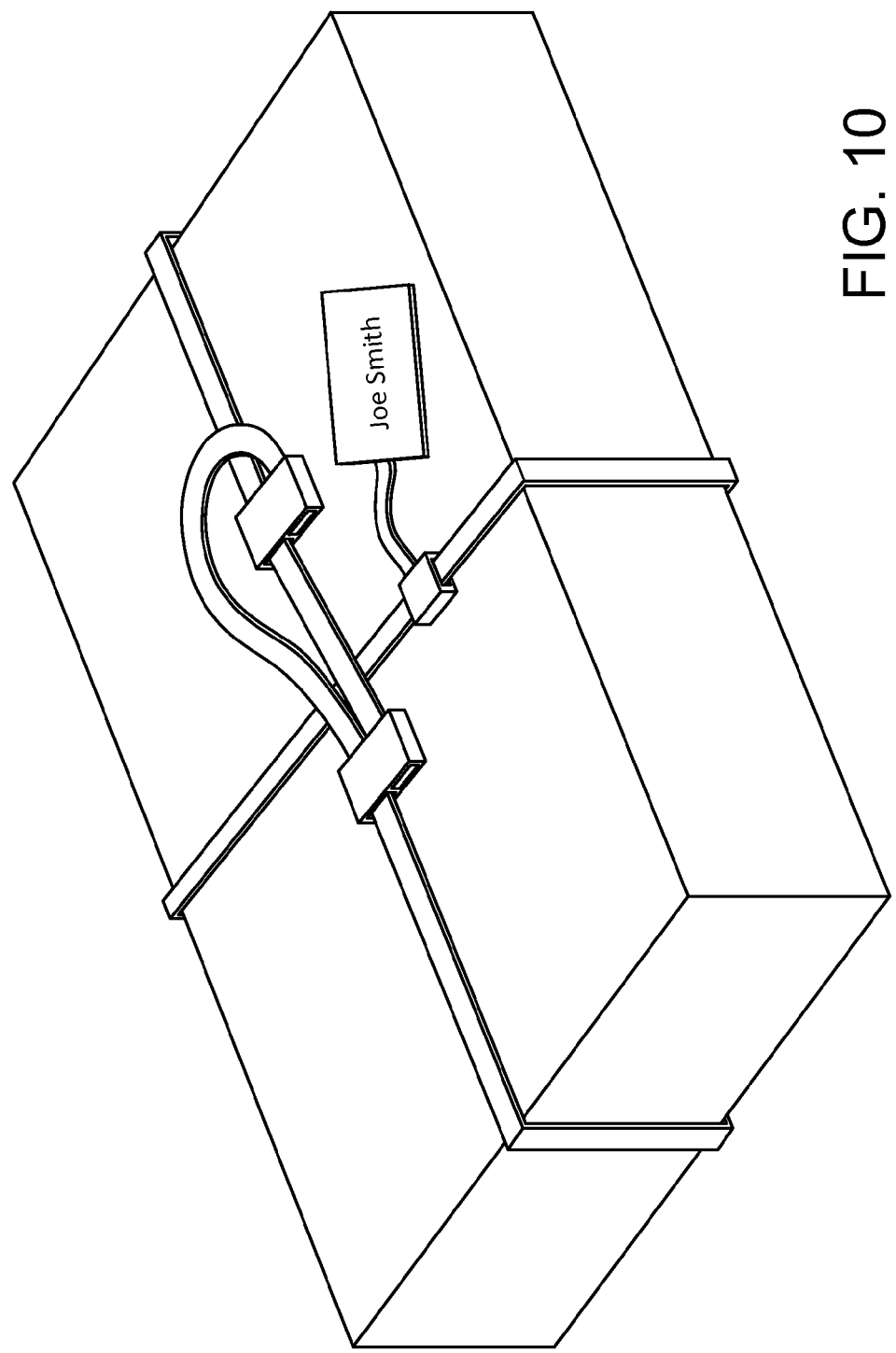
FIG. 10 shows example locking heads and straps that are used to form a handle for a wrapped box and a tag holder.

In some embodiments the locking heads 10 and the straps 20 may serve additional purposes. For example, as shown in FIG. 10, they are used to form a handle for a wrapped box and a tag holder. In some embodiments locking heads 10 may be attachable to or be integral parts of other accessories such as handles and tags. Locking heads may be manufactured with different looks and colors, such as a red flower, for easy identification of one's luggage in the airports and train stations.

Figure 11:
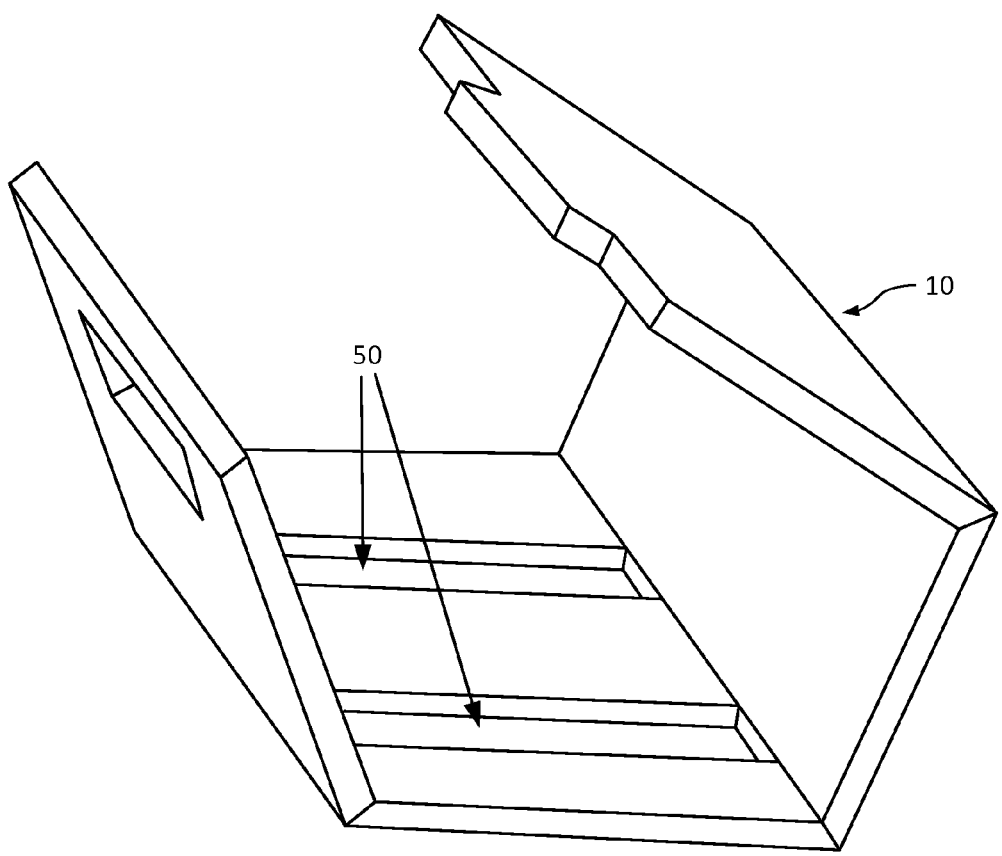
FIG. 11 shows an example locking head that can be opened and closed.

As shown in FIG. 11, in some embodiments the locking heads 10 are configured to open or close to release or hold/grab the strap, respectively. Numerous known mechanisms may be used for closing and/or opening a locking head 10, one of which is depicted in FIG. 11.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention and the invention can be practiced in many ways, as those skilled in the relevant art will recognize. The teachings provided herein can also be applied to other systems, not necessarily the system described herein. The elements and acts of the various embodiments described above can be combined to provide further embodiments.

As noted above, particular terminology used when describing certain features or aspects of the invention should not be taken to imply that the terminology is being redefined herein to be restricted to any specific characteristics, features, or aspects of the invention with which that terminology is associated.

All of the above patents and applications and other references, including any that may be listed in accompanying filing papers, are incorporated herein by reference.

Where the context permits, words in the above Detailed Description using the singular or plural number may also include the plural or singular number respectively.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention. When the claims use the word "or" in reference to a list of two or more items, that word covers all of the following interpretations of the word: any of the items in the list, all of the items in the list and any combination of the items in the list.

I claim:

1. A wrapping apparatus for wrapping an object of any size, the apparatus comprising:
   a strap having at least one pawl configured to bend towards either end of the strap, the strap configured to be cut to any length for wrapping the object; and
   a locking head, having at least one passage way for passage of the strap therethrough and having at least one groove or one non-moveable protrusion or at least one groove and one non-moveable protrusion within the passageway, wherein the strap bends upon entering the passage way of the locking head in an opposite direction of the strap movement and a unidirectional engagement of the strap pawl with the at least one groove or one non-moveable protrusion of the passage way restricts movement of the strap to one direction within the locking head, and wherein each end of the cut strap can enter and go through the passage way from either end of the passage way.

2. The wrapping apparatus of claim 1, wherein the two strap ends pass through the locking head and the restricted directions of the two strap ends are same or different.

3. The wrapping apparatus of claim 1, wherein the strap can enter a passage way from both sides of the passage way.

4. The wrapping apparatus of claim 1, wherein the locking head can be opened to release the strap.

* * * * *